(12) United States Patent
Fu et al.

(10) Patent No.: US 10,219,341 B1
(45) Date of Patent: Feb. 26, 2019

(54) CURRENT CONTROL CIRCUIT AND METHOD FOR CONTROLLING THE SAME, BACKLIGHT ASSEMBLY AND DISPLAY DEVICE

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Siqing Fu, Beijing (CN); Xinghong Liu, Beijing (CN); Shuai Chen, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/966,360

(22) Filed: Apr. 30, 2018

(30) Foreign Application Priority Data

Aug. 31, 2017 (CN) .......................... 2017 1 0778595

(51) Int. Cl.
*H05B 33/08* (2006.01)
*G05F 1/445* (2006.01)
*H05B 37/02* (2006.01)
*G09G 3/34* (2006.01)
*G02F 1/1335* (2006.01)
*G09F 13/04* (2006.01)

(52) U.S. Cl.
CPC ... *H05B 33/0842* (2013.01); *G02F 1/133603* (2013.01); *G05F 1/445* (2013.01); *G09F 13/04* (2013.01); *G09G 3/3426* (2013.01); *H05B 37/02* (2013.01)

(58) Field of Classification Search
CPC ..... H05B 33/0842; H05B 37/02; G09F 13/04; G02F 1/133603; G05F 1/445; G09G 3/3426
See application file for complete search history.

(56) References Cited

U.S. PATENT DOCUMENTS

2011/0043133 A1* 2/2011 Van Laanen ........ H02M 1/4225
   315/294
2014/0375223 A1* 12/2014 Tao .................... H05B 33/0815
   315/186
2016/0050732 A1* 2/2016 Lin ...................... H05B 33/089
   315/121

* cited by examiner

*Primary Examiner* — Tracie Y Green
(74) *Attorney, Agent, or Firm* — Nath, Goldberg & Meyer; Joshua B. Goldberg

(57) ABSTRACT

The present application provides a current control circuit and a method for controlling the same, a backlight assembly and a display device. The current control circuit includes a current regulator, a current detector, a voltage detector, a switching circuit, a controlled circuit and a reference voltage setting device. The current detector is electrically connected with the switching circuit, the controlled circuit and a ground for detecting a current of the controlled circuit, the voltage detector is configured to detect a voltage across at least a portion of the controlled circuit, and a first output terminal of the voltage detector is electrically connected with the reference voltage setting device.

20 Claims, 10 Drawing Sheets

CURRENT CONTROL CIRCUIT AND METHOD FOR CONTROLLING THE SAME, BACKLIGHT ASSEMBLY AND DISPLAY DEVICE

CROSS-REFERENCE TO RELATED APPLICATION

This application claims priority from Chinese Patent Application No. 201710778595.7 filed on Aug. 31, 2017, the disclosure of which is incorporated herein by reference.

TECHNICAL FIELD

The present disclosure relates to the field of current control, and in particular, to a current control circuit and a method for controlling the same, a backlight assembly and a display device.

BACKGROUND

A backlight is a main component of a liquid crystal display device. The backlight includes a plurality of LED light strings (L1, L2, . . . Ln) and current sinks connected with the light strings respectively. The current sink is configured to control each of the LED light strings to emit light, meanwhile to adjust the current flowing in the light string to reach a preset current by detecting a voltage across a preset resistor R connected in series between the light string and a ground in the current sink and comparing the voltage with a reference voltage Vref, thus ensuring a stable lighting of the backlight.

SUMMARY

The present disclosure provides a current control circuit including: a current regulator, a current detector, a voltage detector, a switching circuit, a controlled circuit, and a reference voltage setting device;

the current detector for detecting a current of the controlled circuit is electrically connected with the switching circuit, the controlled circuit and a ground, the voltage detector is configured to detect a voltage across at least a portion of the controlled circuit, and a first output terminal of the voltage detector is electrically connected with the reference voltage setting device;

a first input terminal of the current regulator is electrically connected with the reference voltage setting device;

the switching circuit is configured to switch between a first connection state and a second connection state, wherein in the first connection state, the switching circuit electrically connects a second input terminal of the current regulator with the current detector, and the current detector converts a current detected by itself into a voltage signal and outputs the same to the second input terminal of the current regulator, and the current regulator adjusts a current flowing in the controlled circuit according to the voltage signal output by the current detector and a first reference voltage output by the reference voltage setting device to reach a first current;

in the second connection state, the switching circuit electrically connects the second input terminal of the current regulator with a second output terminal of the voltage detector and simultaneously short-circuits the current detector, and the current regulator adjusts the current flowing in the controlled circuit according to a second reference voltage output by the reference voltage setting device and the voltage output by the voltage detector to reach the first current, and wherein the second reference voltage is a voltage detected by the voltage detector in the first connection state.

In some embodiments, the current regulator includes an operation amplifier and a transistor, wherein an output terminal of the operation amplifier is electrically connected with a gate of the transistor, and a non-inverting input terminal of the operation amplifier serves as the first input terminal of the current regulator and is electrically connected with the reference voltage setting device, and an inverting input terminal of the operation amplifier serves as the second input terminal of the current regulator and is electrically connected with the switching circuit, and wherein a first electrode of the transistor is electrically connected with the current detector and a second electrode of the transistor is electrically connected with one terminal of the controlled circuit.

In some embodiments, the switching circuit includes a first switch, a second switch, and a third switch;

the first switch is connected in parallel with the current detector;

both ends of the second switch are respectively connected with the inverting input terminal of the operation amplifier and the voltage output terminal of the current detector;

both ends of the third switch are respectively connected with the inverting input terminal of the operation amplifier and the second output terminal of the voltage detector.

In some embodiments, at least one of the first switch, the second switch, and the third switch is a transistor.

In some embodiments, the reference voltage setting device includes:

a first reference voltage setting element configured to set and store the first reference voltage and is electrically connected with the non-inverting input terminal of the operation amplifier; and a second reference voltage setting element connected with the non-inverting input terminal of the operation amplifier.

In some embodiments, the second reference voltage setting element includes an analog-to-digital converter, a memory, and a digital-to-analog converter;

an input terminal of the analog-to-digital converter is electrically connected with the first output terminal of the voltage detector, and an output terminal of the analog-to-digital converter is electrically connected with the memory;

an output terminal of the memory is electrically connected with an input terminal of the digital-to-analog converter;

an output terminal of the digital-to-analog converter is electrically connected with the non-inverting input terminal of the operation amplifier.

In some embodiments, the current detector includes a resistor.

In some embodiments, the controlled circuit includes a plurality of components connected in series.

In some embodiments, the voltage detector detects the voltage across at least one of the plurality of components.

In some embodiments, the voltage detector is connected in parallel with one component of the controlled circuit that is electrically connected with the current regulator at one end of the component.

In some embodiments, the component is a lamp bead.

In some embodiments, the lamp bead is a light emitting diode.

The present disclosure provides a method of controlling a current control circuit, the current control circuit including:

a current regulator, a current detector, a voltage detector, a controlled circuit, and a reference voltage setting device;

the current detector for detecting a current of the controlled circuit is electrically connected with the controlled circuit and a ground;

the voltage detector is configured to detect a voltage across at least a portion of the controlled circuit, and a first output terminal of the voltage detector is electrically connected with the reference voltage setting device;

a first input terminal of the current regulator is electrically connected with the reference voltage setting device, wherein, the method includes:

inputting a first reference voltage to the first input terminal of the current regulator and inputting a voltage across the current detector to a second input terminal of the current regulator so that a current flowing in the controlled circuit connected with the current regulator reaches a first current;

measuring a voltage across at least a portion of the controlled circuit under the first current as a second reference voltage;

inputting the second reference voltage to the first input terminal of the current regulator, inputting the voltage across at least a portion of the controlled circuit to the second input terminal of the current regulator and short-circuiting the current detector so that the current flowing in the controlled circuit connected with the current regulator reaches the first current.

In some embodiments, the current detector includes a resistor.

In some embodiments, the controlled circuit includes a plurality of components connected in series.

In some embodiments, the voltage detector detects the voltage across at least one of the plurality of the components.

The present disclosure provides a backlight assembly including a plurality of light strings and at least one current control circuit according to an embodiment of the disclosure, wherein the controlled circuit in the current control circuit is the light string and the component in the controlled circuit is a single lamp bead of the light string.

In some embodiments, one lamp string is electrically connected with one current control circuit.

In some embodiments, the lamp beads are light emitting diodes.

The present disclosure provides a display device including an above backlight assembly.

BRIEF DESCRIPTION OF THE DRAWINGS

In order to more clearly describe the technical solutions in the embodiments of the disclosure or in the prior art, the drawings to be referred to in the description of the embodiments or the prior art will be briefly described below. Obviously, the drawings in the following description are only certain embodiments of the present disclosure, and those skilled in the art can also obtain other drawings based on these drawings without any creative work.

DETAILED DESCRIPTION

The technical solutions in the embodiments of the present disclosure will be clearly and completely described below with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall into the protection scope of the present disclosure.

Figure 1:
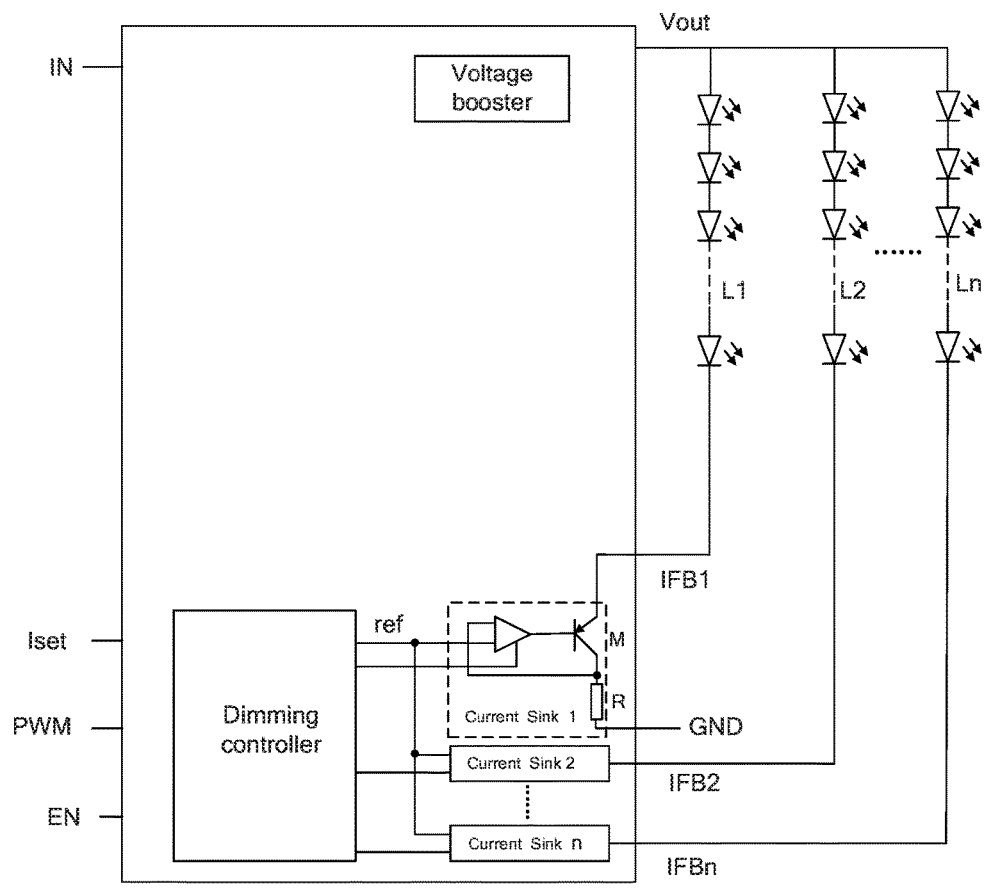
FIG. 1 is a schematic diagram of a backlight current control circuit in the prior art.

In the current control circuit shown in FIG. 1, when the light strings emit light, a current flows through the preset resistance R, which may cause extra power consumption, resulting in a decreased drive efficiency of the current control circuit, especially for mobile electronic products such as mobile phones, notebook computers and the like, such that standby time is significantly reduced.

Figure 2:
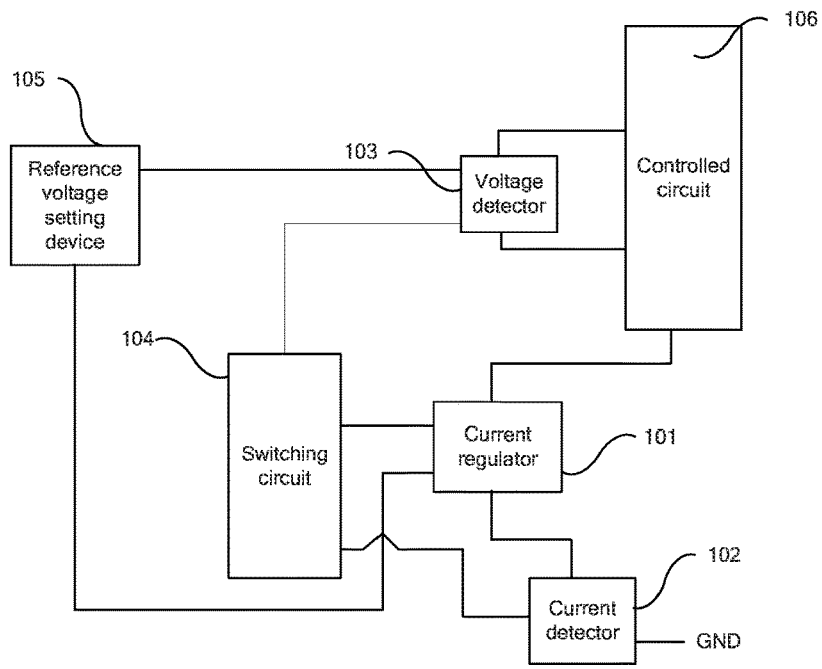
FIG. 2 is a schematic diagram of a current control circuit provided by an embodiment of the present disclosure.

An embodiment of the present disclosure provides a current control circuit. As shown in FIG. 2, the current control circuit 100 includes a current regulator 101, a current detector 102, a voltage detector 103, a switching circuit 104, a reference voltage setting device 105 and a controlled circuit 106.

The current regulator 101 is electrically connected with the switching circuit 104, the current detector 102, the reference voltage setting device 105 and the controlled circuit 106, for adjusting a current flowing in the controlled circuit 106 to reach a first current based on voltages output from the voltage detector 103 and the reference voltage setting device 105 under the control of the switching circuit 104, wherein the first current is a current required for the controlled circuit 106 to operate normally.

The current detector 102 is further electrically connected with the switching circuit 104 and a ground GND.

It should be noted here that, generally, the current detector 102 has a fixed resistance value, and one terminal of the current detector 102 is electrically connected with the ground GND. In this way, by obtaining a voltage at the other terminal of the current detector 102, the current flowing through the current detector 102 (I=U/R) can be obtained. The current detected by the current detector 102 is the current flowing in the controlled circuit 106.

The voltage detector 103 is electrically connected with the switching circuit 104 and the reference voltage setting device 105, and is electrically connected with both ends of at least one of the components of the controlled circuit 106.

The switching circuit 104 is configured to switch the current control circuit 100 between a first connection state C1 and a second connection state C2, wherein in the first connection state C1, the current regulator 101 is electrically connected with the current detector 102, and in the second connection state C2, the current regulator 101 is electrically connected with the voltage detector 103, and meanwhile the current detector 102 is short-circuited (i.e., the current detector 102 does not operate).

The reference voltage setting device 105 is configured to output a first reference voltage Vref1 when the current control circuit 100 is in the first connection state C1, and output a second reference voltage Vref2 when the switching circuit 104 switches the current control circuit 100 to the second connection state C2. The second reference voltage Vref2 is a voltage across at least one of the components of the controlled circuit 106 obtained by the voltage detector 103 when the current control circuit 100 is in the first connection state C1.

The overall operation process of the devices (or circuits) described above will be further described below.

Specifically, under the control of the switching circuit 104, the current control circuit 100 is in the first connection state C1, and a real-time voltage across the current detector 102 is input to the current regulator 101, and at the same time, the reference voltage setting device 105 inputs the first reference voltage Vref1 to the current regulator 101, and the current regulator 101 adjusts the current flowing through the controlled circuit 106 to reach the first current according to the voltages input therein by the current detector 102 and the reference voltage setting device 105 respectively. In a case where the current control circuit 100 is in the first connection state C1 and the current in the controlled circuit 106 reaches the first current, the voltage across the at least one of the components of the controlled circuit 106 is obtained by the voltage detector 103 as a second reference voltage Vref2 and is stored in the reference voltage setting device 105.

Based on this, by the switching circuit 104, the first connection state C1 where the current regulator 101 is electrically connected with the current detector 102 is switched to the second connection state C2 where the current regulator 101 is electrically connected with the voltage detector 103 and the current detector 102 is short-circuited. At the same time, the reference voltage setting device 105 inputs the second reference voltage Vref2 to the current regulator 101. In this case, the current regulator 101 adjusts the current flowing through the controlled circuit 106 to reach the first current based on the voltages respectively input therein from the voltage detector 103 and the reference voltage setting device 105.

In this way, compared with the prior art in which the current of the light string is controlled by adjusting the voltage across the resistor connected with the light string in series, by the technical solution in the present disclosure, the current of the controlled circuit (for example, light string) can be accurately controlled to reach the first current, and in a case where the controlled circuit operates normally at the first current, it can avoid extra power consumption in current detection by short-circuiting the current detector (e.g., a resistor), that is, the disadvantage of extra power consumption caused by the control of the current of the light string by adjusting the voltage of the resistor connected with the light string in series can be avoided, thereby improving the conversion efficiency of the current control circuit.

Specific configurations of the above devices (circuits) will be further described below.

Figure 3:
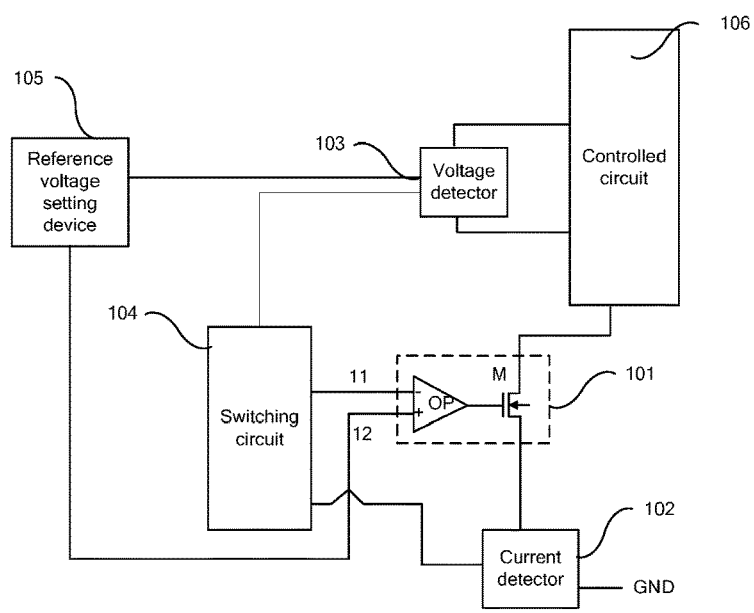
FIG. 3 is a schematic diagram of another current control circuit provided by an embodiment of the present disclosure.

Specifically, as shown in FIG. 3, the above-described current regulator 101 may include an operation amplifier OP and a transistor M.

An output terminal of the operation amplifier OP is electrically connected with a gate of the transistor M, a non-inverting input terminal (+) 12 of the operation amplifier OP is electrically connected with the reference voltage setting device 105, an inverting input terminal (−) 11 of the operation amplifier OP is electrically connected with the switching circuit 104. A first electrode of the transistor M is electrically connected with the current detector 102, and a second electrode of the transistor M is electrically connected with one terminal of the controlled circuit 106.

The transistor M may be an N-type transistor, for example, an N-channel type metal oxide semiconductor transistor (N-type MOS transistor), or a P-type transistor, which is not limited in the present disclosure. The operation amplifier OP compares the input voltages of the inverting input terminal (−) and the non-inverting input terminal (+) to control the magnitude of the voltage of the gate of the transistor M through the output terminal thereof to control state of the transistor M, thereby accurately controlling the current flowing through the controlled circuit 106 to reach the first current.

Figure 4A:
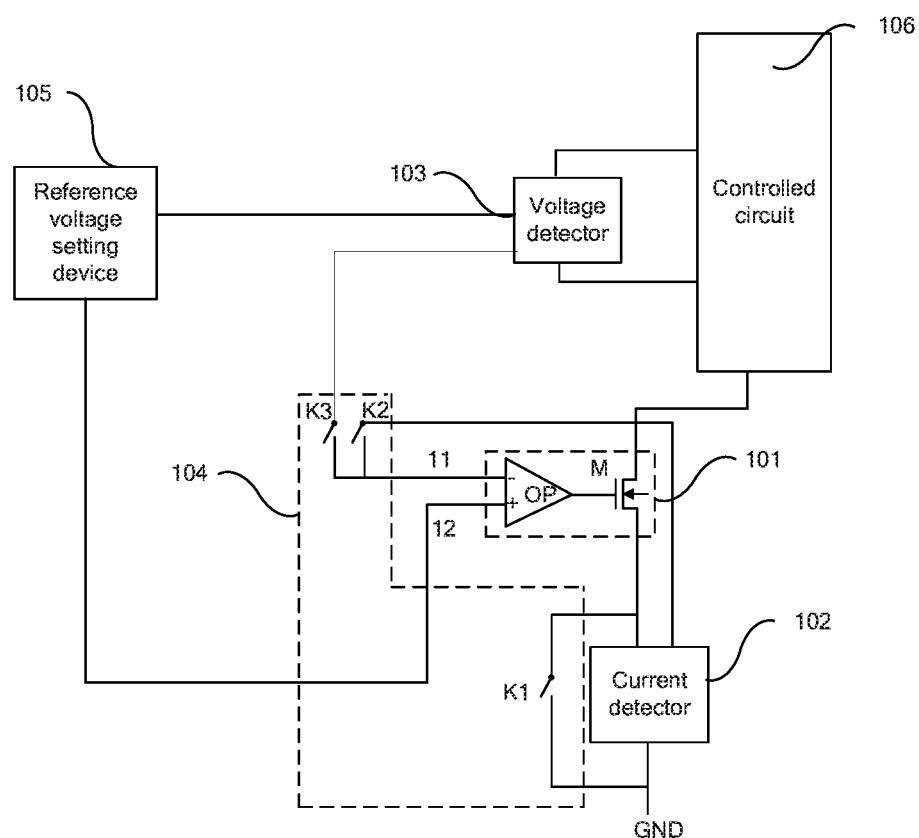
FIG. 4a is a schematic diagram of still another current control circuit provided by an embodiment of the present disclosure.

On this basis, as shown in FIG. 4a, the above-mentioned switching circuit 104 includes a first switch K1, a second switch K2 and a third switch K3.

The first switch K1 is connected in parallel with the current detector 102, and whether the current detector 102 is short-circuited or not can be controlled by controlling turn-on or turn-off of the first switch K1. It should be understood that the turn-on of the first switch K1 means that the current detector 102 is short-circuited and the turn-off of the first switch K1 means that the current detector 102 is not short-circuited.

Two ends of the second switch K2 are respectively connected with the inverting input terminal (−) of the operation amplifier OP in the current regulator 101 and the current detector 102, and connection or disconnection between the current detector 102 and the current regulator 101 is controlled by controlling the turn-on or turn-off of the second switch K2. It should be understood that the turn-on of the second switch K2 means that the current detector 102 is electrically connected with the current regulator 101, and the turn-off of the second switch K2 means that the current detector 102 is disconnected from the current regulator 101.

Two ends of the third switch K3 are respectively connected with the inverting input terminal (−) of the operation amplifier OP in the current regulator 101 and the voltage detector 103, and connection or disconnection between the current regulator 101 and the voltage detector 103 is controlled by controlling turn-on or turn-off of the third switch K3. It should be understood that the turn-on of the third switch K3 means that the voltage detector 103 is electrically connected with the current regulator 101, and the turn-off of the third switch K3 means that the voltage detector 103 is disconnected from the current regulator 101.

It should be noted that FIG. 4 is only a schematic diagram illustrating the first switch K1, the second switch K2, and the third switch K3 with the symbols of the switch. In an actual manufacturing process, the first switch K1, the second switch K2 and the third switch K3 may be transistors, which are controlled to be turned on or off by an input signal; of course, other control forms are available, which is not specifically limited herein, as long as the lines where the first switch K1, the second switch K2 and the third are located can be connected or disconnected through an actual control.

Further, the above reference voltage setting device 105 may include a first reference voltage setting element 107 and a second reference voltage setting element 108.

Figure 4B:
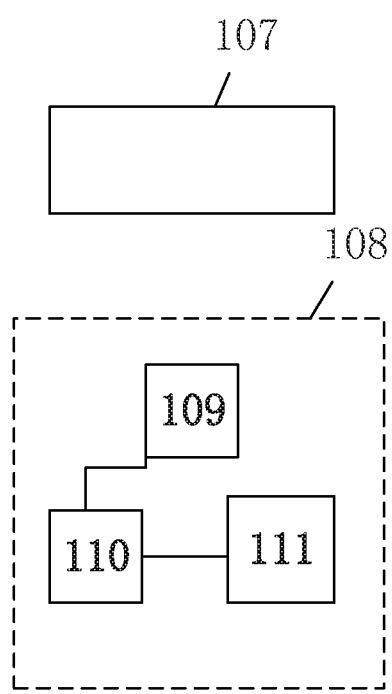
FIG. 4b is a structural diagram of a reference voltage setting device provided by an embodiment of the present disclosure.

As shown in FIG. 4a and FIG. 4b, the first reference voltage setting element 107 is electrically connected with the non-inverting input terminal (+) of the operation amplifier OP in the current regulator 101. The second reference voltage setting element 108 includes an analog-to-digital converter 109, a memory 110 and digital-to-analogue converter 111. An input terminal of the analog-to-digital converter 109 is electrically connected with the voltage detector 103, and an output terminal the analog-to-digital converter 109 is electrically connected with memory 110. An output terminal of memory 110 is electrically connected with an input terminal of digital-to-analog converter 111. An output terminal of the digital-to-analogue converter 111 is electrically connected with the non-inverting input terminal (+) of the operation amplifier OP.

It should be noted that, for the first reference voltage, since the magnitude of the first reference voltage Vref1 is equal to that of a product of the resistance of the current detector 102 and the first current, wherein the first current is a current required for the controlled circuit to operate normally, the magnitude of the first reference voltage Vref1 can be obtained by calculation, and the resistance can be set artificially, and the value of the first reference voltage Vref1 can be a fixed value, therefore, the first reference voltage Vref1 can be output by the first reference voltage setting element 107 with a simple circuit arrangement.

It can be understood that the current required for the normal operation of the controlled circuit 106 may have a standard current value set when the product is shipped, or may be set by the user according to the requirements during use.

For the second reference voltage, since the second reference voltage Vref2 is the voltage across the at least one of the components of the above-mentioned controlled circuit 106 obtained by the voltage detector 103 when the current control circuit 100 is in the first connection state C1, and the resistance of the at least one of the components is not predetermined, thus it is difficult to ensure that the second reference voltage setting element 108 can output the second reference voltage Vref2 by using a simple circuit arrangement.

Based on this, according to an embodiment of the present disclosure, the second reference voltage setting element 108 includes an analog-to-digital converter 109, a memory 110 and a digital-to-analog converter 111, so as to convert an analog signal of the actually measured voltage into a digital signal through the analog-to-digital converter 109, encode the digital signal according to a certain coding rule and store it in the memory 110, and then the digital signal is converted into an analog signal of the voltage through the digital-to-analog converter 111 and output to the non-inverting input terminal (+) of the operation amplifier OP.

Of course, those skilled in the art should understand that, in the first connection state, in order to achieve the effective connection between the first reference voltage setting element 107 in the reference voltage setting device 105 and the non-inverting input terminal (+) of the operation amplifier OP, a control element needs to be provided to output the first reference voltage Vref1 to the non-inverting input terminal (+) of the operation amplifier OP. In addition, in the second connection state, the control element is further configured to effectively connect the second reference voltage setting element 108 with the non-inverting input terminal (+) of the operation amplifier OP to output the second reference voltage Vref2 to the non-inverting input terminal (+) of the operation amplifier OP. The control element may be a circuit or a controller, which is not limited in the disclosure.

Figure 5:
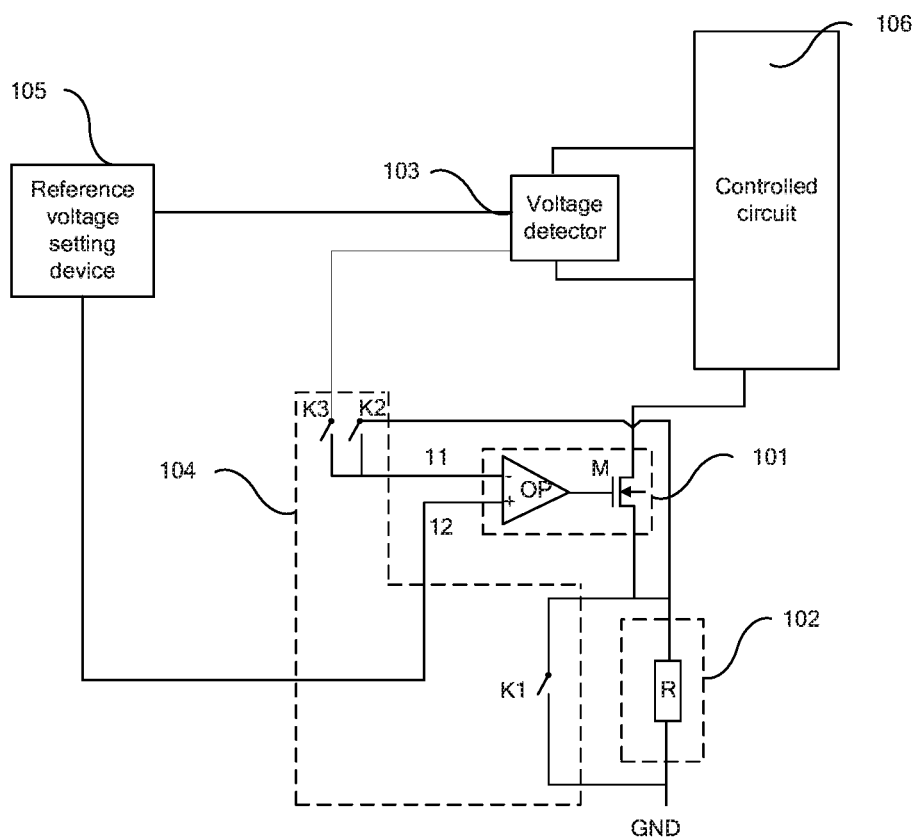
FIG. 5 is a schematic diagram of another current control circuit provided by an embodiment of the present disclosure.

Based on this, as shown in FIG. 5, the current detector 102 may be a fixed resistor R, wherein the fixed resistor R may include a plurality of resistors, or may include only one resistor, which is not limited in the present disclosure.

In addition, as shown in FIG. 2 to FIG. 5, the voltage detector 103 may include one or more of a specific integrated circuit, a controller and a processor, which is not limited in the present disclosure, as long as a voltage across the at least one of the components of the controlled circuit 106 can be detected by the voltage detector 103 and can be output.

In addition, it should be noted that the connection in parallel between the voltage detector 103 and the at least one of the components in the controlled circuit 106 specifically refers to that the voltage detector 103 can be connected with both ends of any component in the controlled circuit, connected with two ends of plurality of consecutive components, or connected with both ends of all of the components connected as a whole, which is not limited in this disclosure, and can be actually set according to actual requirements.

Figure 6:
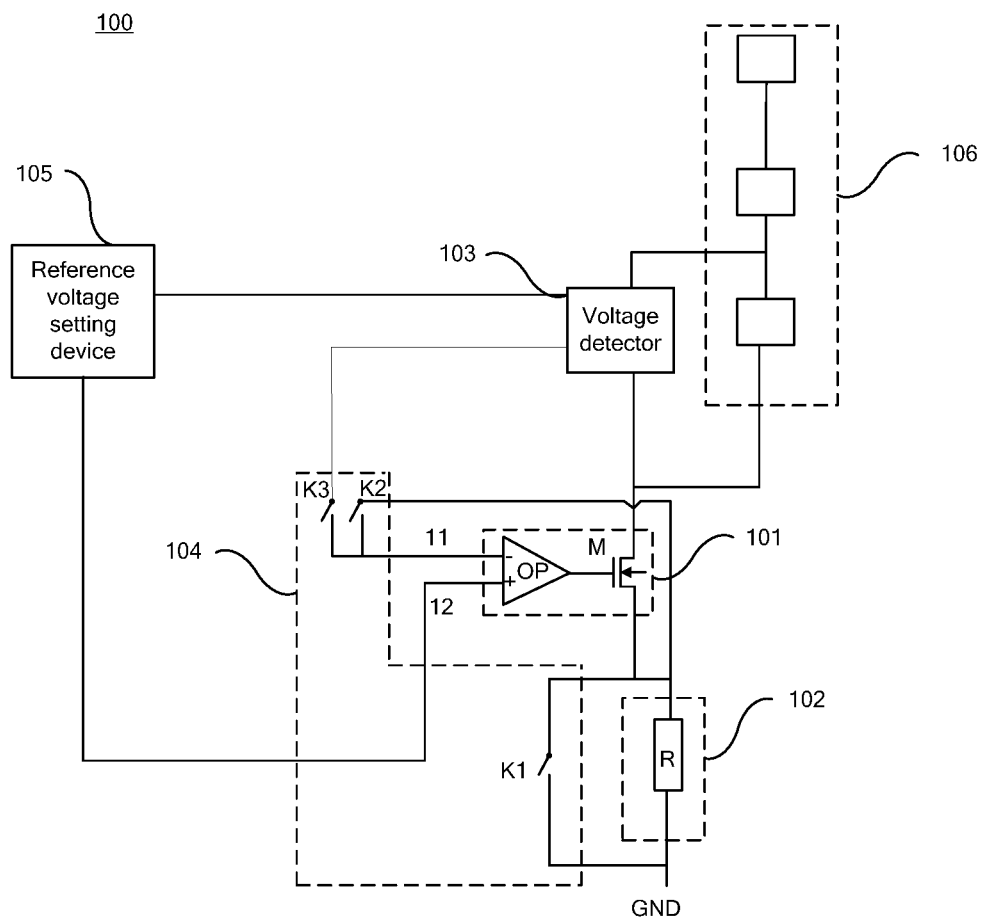
FIG. 6 is a schematic diagram of another current control circuit provided by an embodiment of the present disclosure.

On this basis, since the current regulator 101 is electrically connected with one terminal of the controlled circuit 106, in consideration of the actual wiring arrangement, too long wirings and excessive wirings should be avoided. In one embodiment of the present disclosure, as shown in FIG. 6, the voltage detector 103 is electrically connected with both ends of a component of the controlled circuit 106 closest to the one terminal, so that the wiring closest to the one terminal of the voltage detector 103 connected with the controlled circuit 106 can be shared with the current regulator 101, that is, the circuit is simplified.

Figure 7:
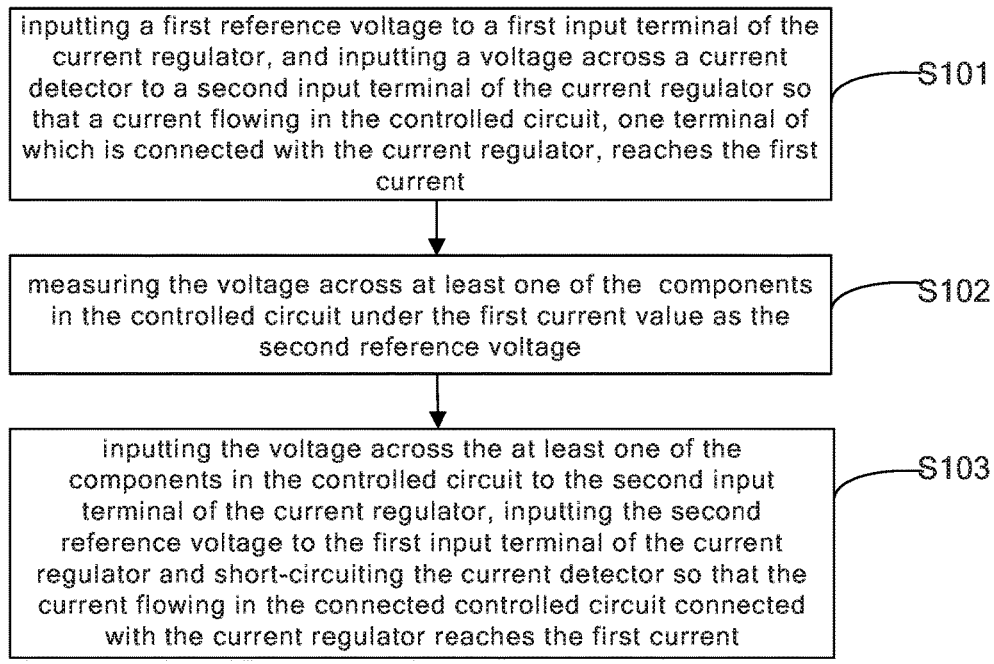
FIG. 7 is a flowchart of a method for controlling a current control circuit provided by an embodiment of the present disclosure.

An embodiment of the present disclosure also provides a method for controlling a current control circuit. The current control circuit includes a current regulator, as shown in FIG. 7, the method including:

Step S101, inputting a first reference voltage to a first input terminal of the current regulator, and inputting a voltage across a current detector to a second input terminal of the current regulator so that a current flowing in the controlled circuit, one terminal of which is electrically connected with the current regulator, reaches the first current.

Step S102, measuring the voltage across at least one of the components in the controlled circuit at the first current as a second reference voltage.

Step S103, inputting the voltage across the at least one of the components in the controlled circuit to the second input terminal of the current regulator, inputting the second reference voltage to the first input terminal of the current regulator and short-circuiting the current detector so that the current flowing in the connected controlled circuit connected with the current regulator reaches the first current.

Specifically, the method for controlling the current control circuit is further described below in conjunction with the above-mentioned current control circuit provided in the present disclosure. Of course, the present method is not limited to the foregoing current control circuit, and other current control circuits may be selected according to the method in the present disclosure and should be fallen into the scope of the method in the present disclosure.

For example, in the foregoing current control circuit 100, the current regulator 101 includes an operation amplifier OP and a transistor M, the switching circuit 104 includes a first switch K1, a second switch K2 and a third switch K3, the current detector 102 is a resistor R having a fixed resistance value, the reference voltage setting device 105 includes a first reference voltage setting element 107 and a second reference voltage setting element 108, wherein the connection relationships of these parts can refer to FIG. 2 to FIG. 6 and the aforementioned description, which is not repeated herein. Based on this arrangement, the above method may be specifically as follows.

Figure 8A:
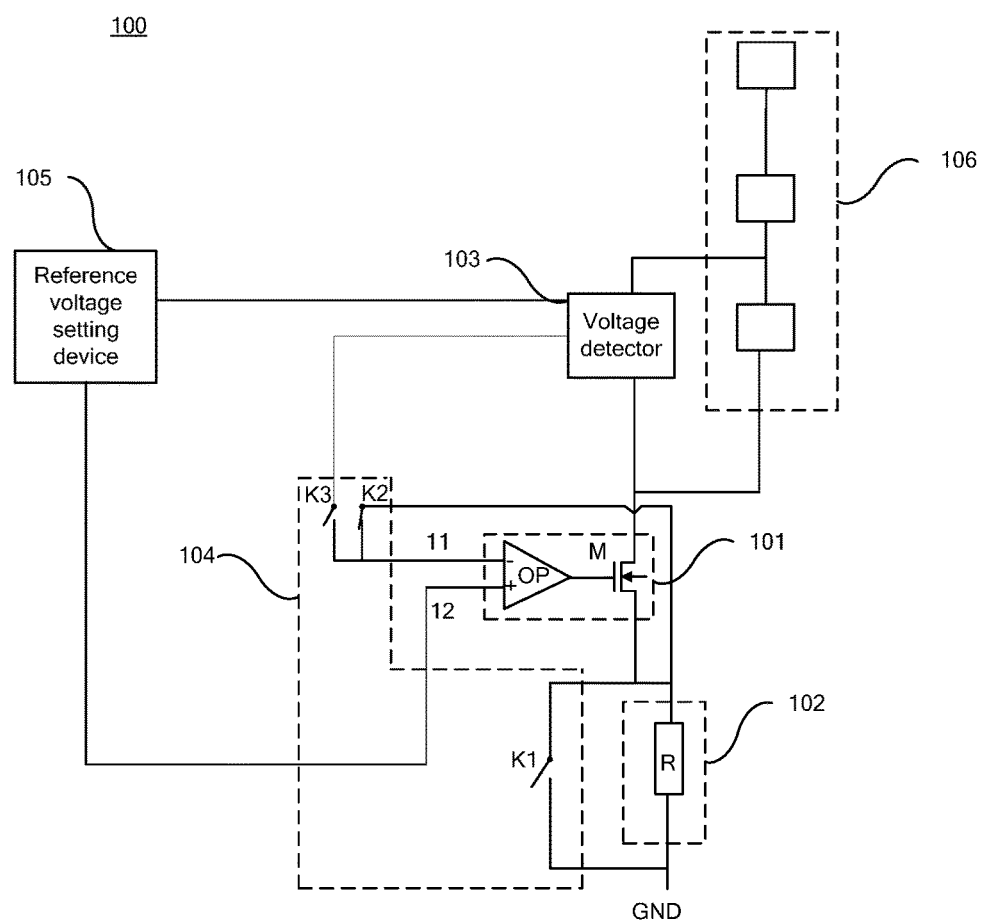
FIG. 8a is a schematic diagram of a control process of a current control circuit provided by an embodiment of the present disclosure.

The above step S101 may specifically include:

as shown in FIG. 8a, the second switch K2 is turned on, the first switch K1 and the third switch K3 are turned off, so that the voltage across the current detector 102 is input to the inverting input terminal of the operation amplifier OP (i.e., the second input terminal of the current regulator 101), at this time, it is in the first connection state C1 where the current regulator 101 is electrically connected with the current detector 102, so that the first reference voltage Vref1 from the first reference voltage setting element is input to the non-inverting input terminal of the operation amplifier OP (that is, the first input terminal of the current regulator 101). The operation amplifier OP compares the voltages output from the inverting input terminal (−) and the non-inverting input terminal (+), to control the state of the transistor M through the output terminal of the operation amplifier OP, and thus accurately control the current flowing in the controlled circuit (light string L) to reach the first current.

The above step S102 may include:

the voltage across the at least one of the components of the controlled circuit 106 under the first current (for example, one component of the controlled circuit 106 closest to the current regulator 101) is measured by the voltage detector 103 and is stored in the second reference voltage setting element 108 in the reference voltage setting device 105 as the second reference voltage Vref2.

Figure 8B:
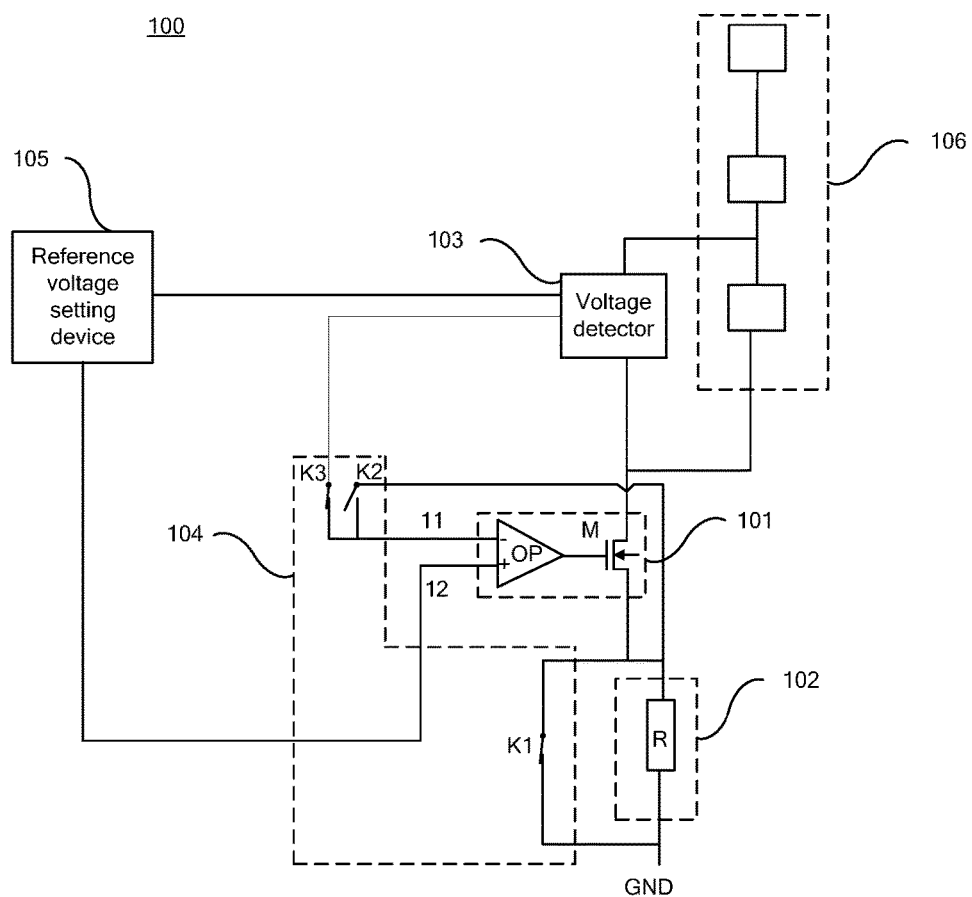
FIG. 8b is a schematic diagram of a control process of a current control circuit provided by an embodiment of the present disclosure.

The above step S103 may include:

as shown in FIG. 8b, the second switch K2 is turned off the first switch K1 and the third switch K3 are turned on, so that the voltage across the at least one of the components of the aforementioned controlled circuit 106 measured by the voltage detector 103 is input to the inverting input terminal of the operation amplifier OP (i.e., the second input terminal of the current regulator 101). At this time, it is in the second connection state C2 where the current regulator 101 is electrically connected with the voltage detector 103, so that the second reference voltage Vref2 from the second reference voltage setting element 108 is input to the non-inverting input terminal of the operation amplifier OP (that is, the first input terminal of the current regulator 101) and the current detector 102 is short-circuited, The operation amplifier OP compares the voltages output from the inverting input terminal (−) and the non-inverting input terminal (+), to control the state of the transistor M through the output terminal of the operation amplifier OP, and thus accurately control the current flowing in the controlled circuit (light string L) to reach the first current.

In this way, compared with the prior art in which the current of the light string is controlled by adjusting the voltage across the resistor connected with the light string in series, by the technical solution in the present disclosure, the current of the controlled circuit (for example, light string) can be accurately controlled to reach the first current, and in a case where the controlled circuit operates normally at the first current, it can avoid extra power consumption in current detection by short-circuiting the current detector (e.g., a resistor), that is, the disadvantage of extra power consumption caused by the control of the current of the light string by adjusting the voltage of the resistor connected with the light string in series can be avoided, thereby improving the conversion efficiency of the current control circuit.

Figure 9:
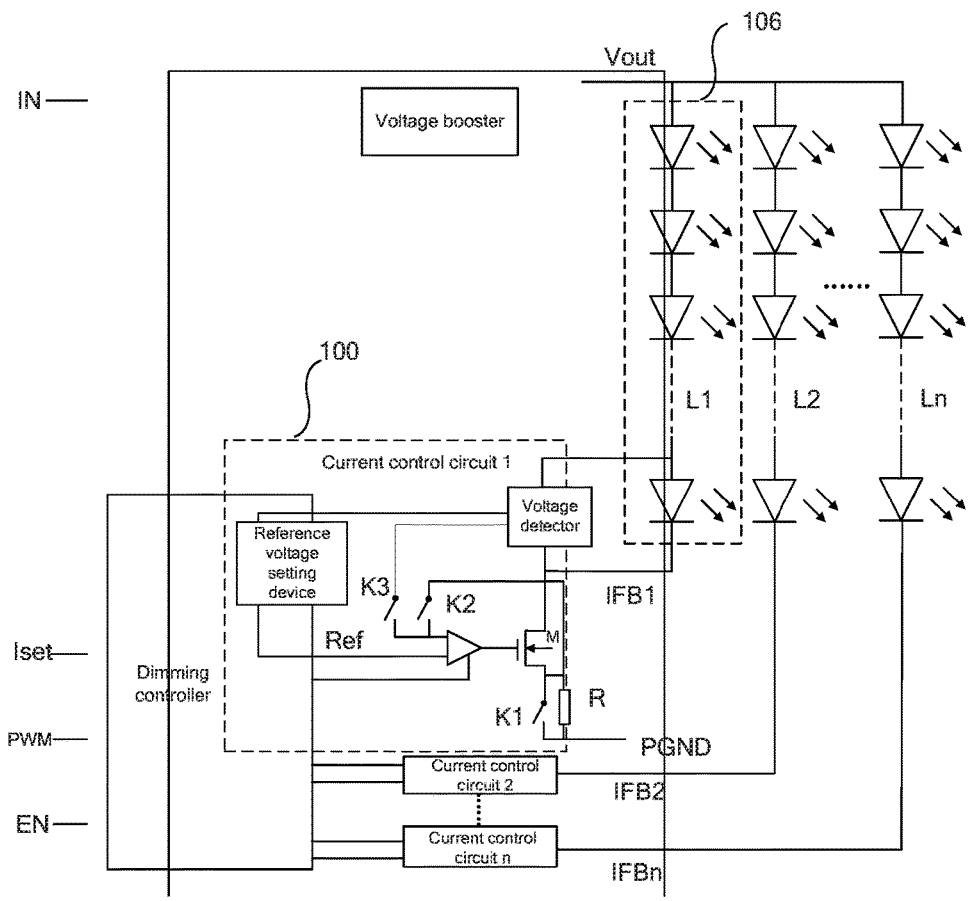
FIG. 9 is a schematic diagram of a current control circuit of a backlight assembly provided by an embodiment of the present disclosure.

An embodiment of the present disclosure further provides a backlight assembly, as shown in FIG. 9, including a plurality of light strings L (e.g., L1, L2, . . . Ln) and at least one current control circuit 100 as described above, wherein the controlled circuit 106 in the current control circuit 100 is a light string L, and the component in the controlled circuit 106 is a single lamp bead of the light string L.

Since the backlight assembly includes the aforementioned current control circuit, it has the same structure and advantageous effects as the current control circuit provided by the foregoing embodiment. Since the foregoing embodiment has described the structure and beneficial effects of the current control circuit in detail, it will not be described again here.

Based on this, in order to minimize the extra power consumption, according to an embodiment of the present disclosure, one light string L is electrically connected with one current control circuit 100, thereby ensuring that the currents of all light strings are accurately controlled by the current control circuits to reach the first current, at the same time, avoiding the problem of extra power consumption caused by the resistors connected with the light strings in series, thereby increasing the conversion efficiency of the backlight control circuit to the largest extent.

In addition, in order to simplify the circuit and avoid using too long or excessive wirings, in some embodiments, the voltage detector 103 is electrically connected with both ends of one of the lamp beads of the light string L closest to one end of the light string. The specific reasons can refer to the foregoing content, which will not be repeated here.

In an embodiment of the present disclosure, the lamp bead may be a light emitting diode, and one terminal of the controlled circuit 106 connected with the current regulator 101 is the cathode of the last light emitting diode of the light string L.

Of course, for the backlight assembly, the current control circuit 100 may be integrated in the backlight driving chip as a whole, and the backlight driving chip further includes a voltage booster, a dimming controller and the like. Connections of the ports of the backlight driving chip (for example, Iset, PWM, EN, IN, IFB, etc.) are similar to those in the prior art, and will not be described here.

An embodiment of the present disclosure further provides a display device including the aforementioned backlight assembly. The backlight assembly includes the current control circuit as described above, and has the same structure and beneficial effects as the current control circuit provided by the foregoing embodiments. Because the structure and beneficial effects of the current control circuit has been described in detail in the foregoing embodiment, it will not be repeated here.

Persons of ordinary skill in the art can understand that all or a part of the steps for implementing the above method embodiment can be accomplished through hardware related to program instructions. The aforementioned program instructions can be stored in a computer-readable storage medium. When the program instructions are executed, steps including the above method embodiments are executed. The foregoing storage medium includes various media that can store program codes, such as a ROM, a RAM, a magnetic disk, an optical disc or the like.

It can be understood that the embodiments mentioned above are merely exemplary embodiments used for illustrating the principle of the present disclosure, but the present disclosure is not limited thereto. For those skilled in the art, various modifications and improvements may be made without departing from the spirit and essence of the present disclosure, and these variations and improvements are also considered within the protection scope of the present disclosure.

The invention claimed is:

1. A current control circuit comprising: a current regulator, a current detector, a voltage detector, a switching circuit, a controlled circuit, and a reference voltage setting device;
the current detector for detecting a current of the controlled circuit is electrically connected with the switching circuit, the controlled circuit and a ground,
the voltage detector is configured to detect a voltage across at least a portion of the controlled circuit, and a first output terminal of the voltage detector is electrically connected with the reference voltage setting device;
a first input terminal of the current regulator is electrically connected with the reference voltage setting device;
the switching circuit is configured to switch between a first connection state and a second connection state, wherein
in the first connection state, the switching circuit electrically connects a second input terminal of the current regulator with the current detector, and the current detector converts a current detected by itself into a voltage signal and outputs the same to the second input terminal of the current regulator, and the current regulator adjusts a current flowing in the controlled circuit according to the voltage signal output by the current detector and a first reference voltage output by the reference voltage setting device to reach a first current;
in the second connection state, the switching circuit electrically connects the second input terminal of the current regulator with a second output terminal of the voltage detector and simultaneously short-circuits the current detector, and the current regulator adjusts the current flowing in the controlled circuit according to a second reference voltage output by the reference voltage setting device and the voltage output by the voltage detector to reach the first current, and wherein
the second reference voltage is a voltage detected by the voltage detector in the first connection state.

2. The current control circuit according to claim 1, wherein
the current regulator includes an operation amplifier and a transistor,
an output terminal of the operation amplifier is electrically connected with a gate of the transistor, and a non-inverting input terminal of the operation amplifier serves as the first input terminal of the current regulator and is electrically connected with the reference voltage setting device, and an inverting input terminal of the operation amplifier serves as the second input terminal of the current regulator and is electrically connected with the switching circuit, and wherein
a first electrode of the transistor is electrically connected with the current detector and a second electrode of the transistor is electrically connected with one terminal of the controlled circuit.

3. The current control circuit according to claim 2, wherein the switching circuit comprises a first switch, a second switch, and a third switch;
the first switch is connected in parallel with the current detector;
both ends of the second switch are respectively connected with the inverting input terminal of the operation amplifier and the voltage output terminal of the current detector;
both ends of the third switch are respectively connected with the inverting input terminal of the operation amplifier and the second output terminal of the voltage detector.

4. The current control circuit according to claim 3, wherein at least one of the first switch, the second switch, and the third switch is a transistor.

5. The current control circuit according to claim 3, wherein the reference voltage setting device includes:
a first reference voltage setting element configured to set and store the first reference voltage and is electrically connected with the non-inverting input terminal of the operation amplifier; and
a second reference voltage setting element connected with the non-inverting input terminal of the operation amplifier.

6. The current control circuit according to claim 5, wherein
the second reference voltage setting element includes an analog-to-digital converter, a memory, and a digital-to-analog converter;
an input terminal of the analog-to-digital converter is electrically connected with the first output terminal of the voltage detector, and an output terminal of the analog-to-digital converter is electrically connected with the memory;
an output terminal of the memory is electrically connected with an input terminal of the digital-to-analog converter;
an output terminal of the digital-to-analog converter is electrically connected with the non-inverting input terminal of the operation amplifier.

7. The current control circuit according to claim 1, wherein the current detector comprises a resistor.

8. The current control circuit according to claim 1, wherein the controlled circuit includes a plurality of components connected in series.

9. The current control circuit according to claim 8, wherein the voltage detector detects the voltage across at least one of the plurality of components.

10. The current control circuit according to claim 9, wherein the voltage detector is connected in parallel with one component of the controlled circuit that is electrically connected with the current regulator at one end of the controlled circuit.

11. The current control circuit according to claim 8, wherein the component is a lamp bead.

12. The current control circuit according to claim 11, wherein the lamp bead is a light emitting diode.

13. A method of controlling a current control circuit, the current control circuit comprising: a current regulator, a current detector, a voltage detector, a controlled circuit, and a reference voltage setting device;
the current detector for detecting a current of the controlled circuit is electrically connected with the controlled circuit and a ground;
the voltage detector is configured to detect a voltage across at least a portion of the controlled circuit, and a first output terminal of the voltage detector is electrically connected with the reference voltage setting device;
a first input terminal of the current regulator is electrically connected with the reference voltage setting device, wherein, the method comprises:
inputting a first reference voltage to the first input terminal of the current regulator and inputting a voltage across the current detector to a second input terminal of the current regulator so that a current flowing in the controlled circuit connected with the current regulator reaches a first current;
measuring a voltage across at least a portion of the controlled circuit under the first current as a second reference voltage;
inputting the second reference voltage to the first input terminal of the current regulator, inputting the voltage across at least a portion of the controlled circuit to the second input terminal of the current regulator and short-circuiting the current detector so that the current flowing in the controlled circuit connected with the current regulator reaches the first current.

14. The control method according to claim 13, wherein the current detector includes a resistor.

15. The control method according to claim 14, wherein the controlled circuit includes a plurality of components connected in series.

16. The control method according to claim 15, wherein the voltage detector detects the voltage across at least one of the plurality of components.

17. A backlight assembly comprising a plurality of light strings and at least one current control circuit as claimed in claim 1, wherein the controlled circuit in the current control circuit is the light string and the component in the controlled circuit is a single lamp bead of the light string.

18. The backlight assembly according to claim 17, wherein one lamp string is electrically connected with one current control circuit.

19. The backlight assembly according to claim 17, wherein the lamp beads are light emitting diodes.

20. A display device comprising a backlight assembly, which is the backlight assembly of claim 17.

* * * * *